(12) United States Patent
Stegmiller et al.

(10) Patent No.: US 8,109,702 B2
(45) Date of Patent: Feb. 7, 2012

(54) ATTENUATED CARGO CASTER

(75) Inventors: Wesley Keith Stegmiller, Jamestown, ND (US); Justin Wade Smith, Bismarck, ND (US); Justin Daniel Williams, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 253 days.

(21) Appl. No.: 12/540,074

(22) Filed: Aug. 12, 2009

(65) Prior Publication Data
US 2010/0054889 A1 Mar. 4, 2010

Related U.S. Application Data

(60) Provisional application No. 61/092,595, filed on Aug. 28, 2008.

(51) Int. Cl.
*B60B 7/00* (2006.01)
(52) U.S. Cl. .................. 410/92; 410/69; 193/35 B
(58) Field of Classification Search .............. 410/46, 410/92, 69, 77, 94; 193/35 A, 37, 35 SS, 193/35 MD, 35 B; 244/118.1, 137.1; 414/529, 414/530, 531, 533, 535, 536
See application file for complete search history.

(56) References Cited

U.S. PATENT DOCUMENTS

| | | | |
|---|---|---|---|
| 1,852,942 A | 8/1931 | Streine | |
| 3,262,588 A | 7/1966 | Davidson | |
| 3,576,250 A | 4/1971 | Aitken | |
| 3,613,852 A | 10/1971 | Schwarzbek | |
| 3,690,440 A | 9/1972 | MacPherson | |
| 3,741,504 A | 6/1973 | Alberti | |
| 4,081,157 A * | 3/1978 | Petry | |
| 4,285,550 A | 8/1981 | Blackburn | |
| 4,347,794 A | 9/1982 | Nordstrom | |
| 5,020,657 A * | 6/1991 | Huber | |
| 5,568,858 A | 10/1996 | Thompson | |
| 5,803,234 A | 9/1998 | Podkanski | |
| 6,109,415 A | 8/2000 | Morgan | |
| 6,131,717 A | 10/2000 | Owen | |

(Continued)

FOREIGN PATENT DOCUMENTS

DE  592901 C  2/1934

(Continued)

OTHER PUBLICATIONS

DE 4 328 978 A1 (Deutsche Aerospace Airbus GmbH) Mar. 2, 1995 (abstract) [online] [retrieved on Nov. 16, 2010] Retrieved from Thomson Innovation.

(Continued)

*Primary Examiner* — Stephen Gordon
(74) *Attorney, Agent, or Firm* — Womble Carlyle Sandridge & Rice, LLP

(57) ABSTRACT

A caster for use in aircraft along a cargo deck comprises a housing having at least one wall, a pivot assembly, a brake assembly and at least one spring. A pivot assembly can have at least one wall, first and second ends, and a base between the first and second ends, wherein the first end of the pivot assembly can be elevated above the second end of the pivot assembly. The wall of the pivot assembly can be rotatably linked to the wall of the housing. An optional brake assembly can be on the first end of the pivot assembly. At least one spring can be on the second end of the pivot assembly. A cover on or above the at least one spring can be secured to the wall of the housing.

22 Claims, 16 Drawing Sheets

U.S. PATENT DOCUMENTS

| | | | |
|---|---|---|---|
| 6,279,730 | B1 | 8/2001 | Schreger |
| 6,354,424 | B1 | 3/2002 | Rowles |
| 6,612,422 | B2 | 9/2003 | Roberts |
| 6,827,183 | B1 | 12/2004 | Polcuch |
| 7,014,038 | B2 | 3/2006 | Leingang |
| 7,556,462 | B2 * | 7/2009 | Huber ............................ 410/92 |
| 2006/0065786 | A1 | 3/2006 | Huber |
| 2009/0101466 | A1 | 4/2009 | Karcher |

FOREIGN PATENT DOCUMENTS

| | | |
|---|---|---|
| DE | 43 28 978 A1 | 3/1995 |
| DE | 691 07 605 T2 | 6/1995 |
| DE | 43 28 978 C2 | 12/1995 |
| DE | 195 39 627 A1 | 5/1996 |
| EP | 497 045 A1 | 8/1992 |
| WO | WO 2007/121951 A1 | 11/2007 |

OTHER PUBLICATIONS

German Official Action (DE App. No. 10 2009 038 683.1-22), dated Sep. 28, 2010, pp. 1-5.

English translation of German Official Action (DE App. No. 10 2009 038 683.1-22), dated Sep. 28, 2010, pp. 1-3.

* cited by examiner

ATTENUATED CARGO CASTER

CROSS REFERENCE TO RELATED APPLICATIONS

This application claims the benefit of priority of U.S. Application Ser. No. 61/092,595, filed Aug. 28, 2008, the disclosure of which is hereby incorporated by reference in its entirety.

FIELD OF THE INVENTION

The invention relates to cargo loading and unloading systems for aircraft and the like, and more particularly to an attenuated caster for improving control of cargo during loading and unloading.

BACKGROUND

A cargo handling system conveys and secures containerized and palletized cargo on an aircraft for fast and easy loading and unloading. Cargo systems are installed on the lower deck on passenger aircraft and also on the main deck of freighter aircraft. A typical system consists of conveyor rollers and tracks, or roller trays, side rail guides, side and end latches, power drive units ("PDUs") and a PDU control unit. Additional components, such as various braking mechanisms, help limit movement of cargo during loading and unloading.

Items that are shipped by air typically are loaded first onto specially configured pallets, or into specially configured containers. In the air freight industry, these various pallets and containers are commonly referred to as Unit Load Devices ("ULDs"). ULDs are available in various sizes, shapes and capacities. Airlines can load and unload ULDs multiple times per day.

To facilitate movement of a ULD within an aircraft's cargo compartment, as the ULD is loaded, stowed, and unloaded, the deck of an aircraft cargo compartment typically includes a number of raised roller elements. These roller elements often include elongated roller trays that extend longitudinally along the length of the cargo deck, ball panel units, and the like. For example, roller trays typically include elongated rows of cylindrical rollers that extend in a fore and aft direction. Ball panel units include plates with upwardly protruding rotatable spherical balls. The ULDs sit atop these roller elements, and the roller elements facilitate rolling movement of the ULDs within the cargo compartment. The apex of these roller elements can form what is known in the art as the conveyor plane. The conveyor plane also refers to a bottom plane on which a ULD (with a completely flat underside) traverses.

Unwanted movement of ULDs during loading and unloading can be a safety risk to the loaders. This unwanted movement may also cause damage to the aircraft's cargo compartment. Typically, a loader manually moves a ULD into and from its stowage position. Such movement can result regardless of whether the ULD is being manually loaded or unloaded, or being driven by a PDU. Braking mechanisms are installed on the floor of the cargo compartment to help protect cargo loaders and the aircraft from possible damage during loading and unloading. These braking mechanisms help control unwanted movement of the ULDs during these loading and unloading cycles.

A typical braking mechanism is a braking caster. A braking caster can have a rotating element that protrudes above the conveyor plane and is typically installed near the cargo door. The rotating element of the braking caster is configured to slow and stop a ULD, but allow travel when the ULD is manually or power driven. To accomplish this, the rotating element must be elevated above the conveyor plane to provide sufficient cargo contact and normal force for braking. However, the height at which the rotating element must be positioned can in fact lead to undesired damage to a ULD or the aircraft. Thus, a need has arisen for a rolling mechanism that facilitates or restricts cargo movement while minimizing the opportunity for damage to the cargo or aircraft during loading, unloading or transport.

SUMMARY

A caster for use in aircraft along a cargo deck comprises a housing having at least one wall, a pivot assembly, an optional brake assembly and at least one spring. A pivot assembly can have at least one wall, first and second ends, and a base between the first and second ends, wherein the first end of the pivot assembly can be elevated above the second end of the pivot assembly. The wall of the pivot assembly can be rotatably linked to the wall of the housing. A brake assembly can be on the first end of the pivot assembly. At least one spring can be on the second end of the pivot assembly. A cover on above the at least one spring can be secured to the wall of the housing.

These and other aspects of the invention will be understood from a reading of the following written description, together with the drawings.

DETAILED DESCRIPTION

Figure 1:
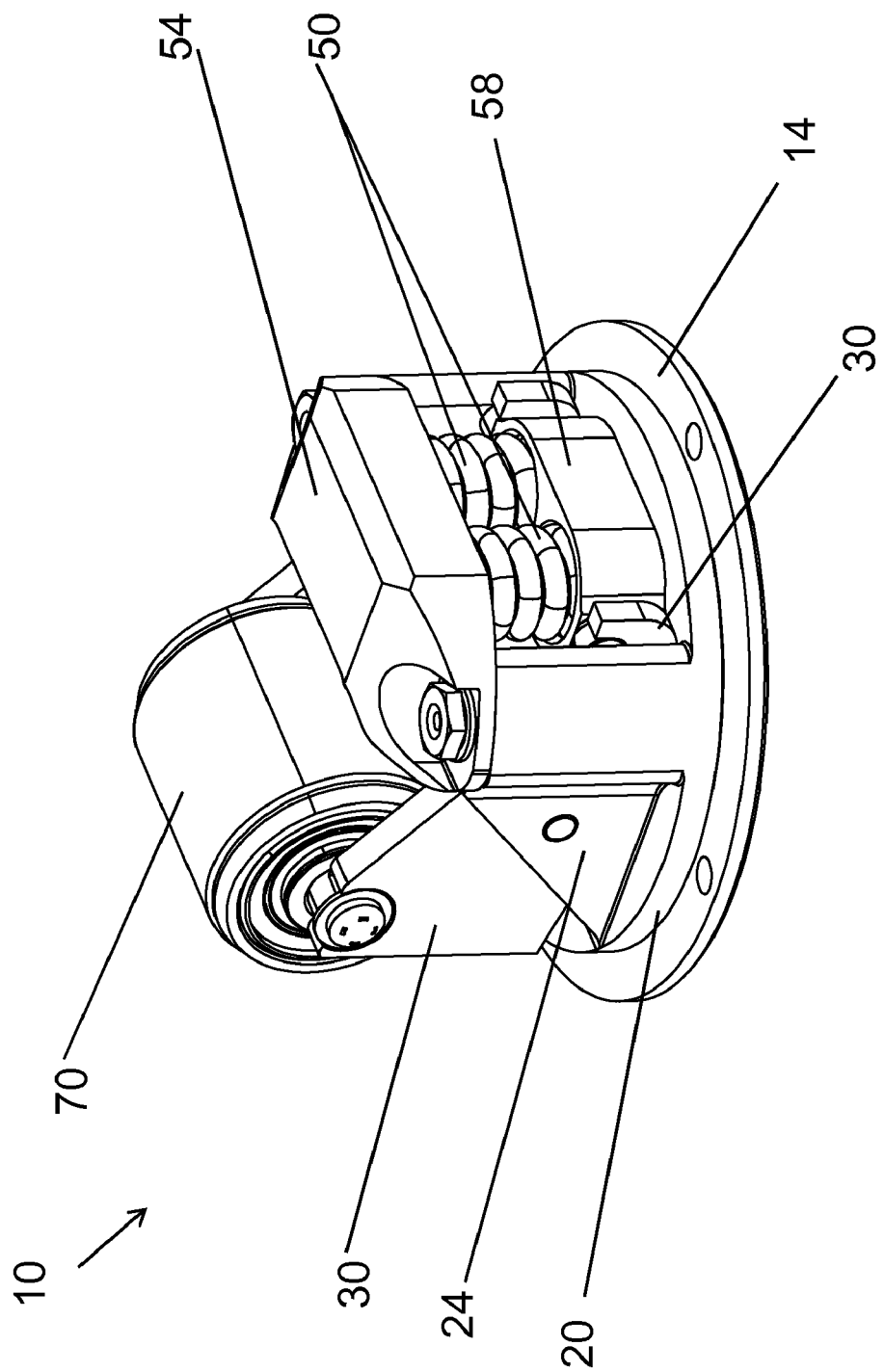
FIG. 1 is a top perspective view of an attenuated caster.

As shown in FIG. 1, one embodiment of an attenuated caster 10 comprises a base 14, housing 20 and a pivot assembly 30 operably linked to housing wall 24. Pivot assembly 30 engages spring support 58 exerting an upward force on spring cover 54 through springs 50. Brake assembly 70 extends upward to receive a ULD (not shown).

Figure 2:
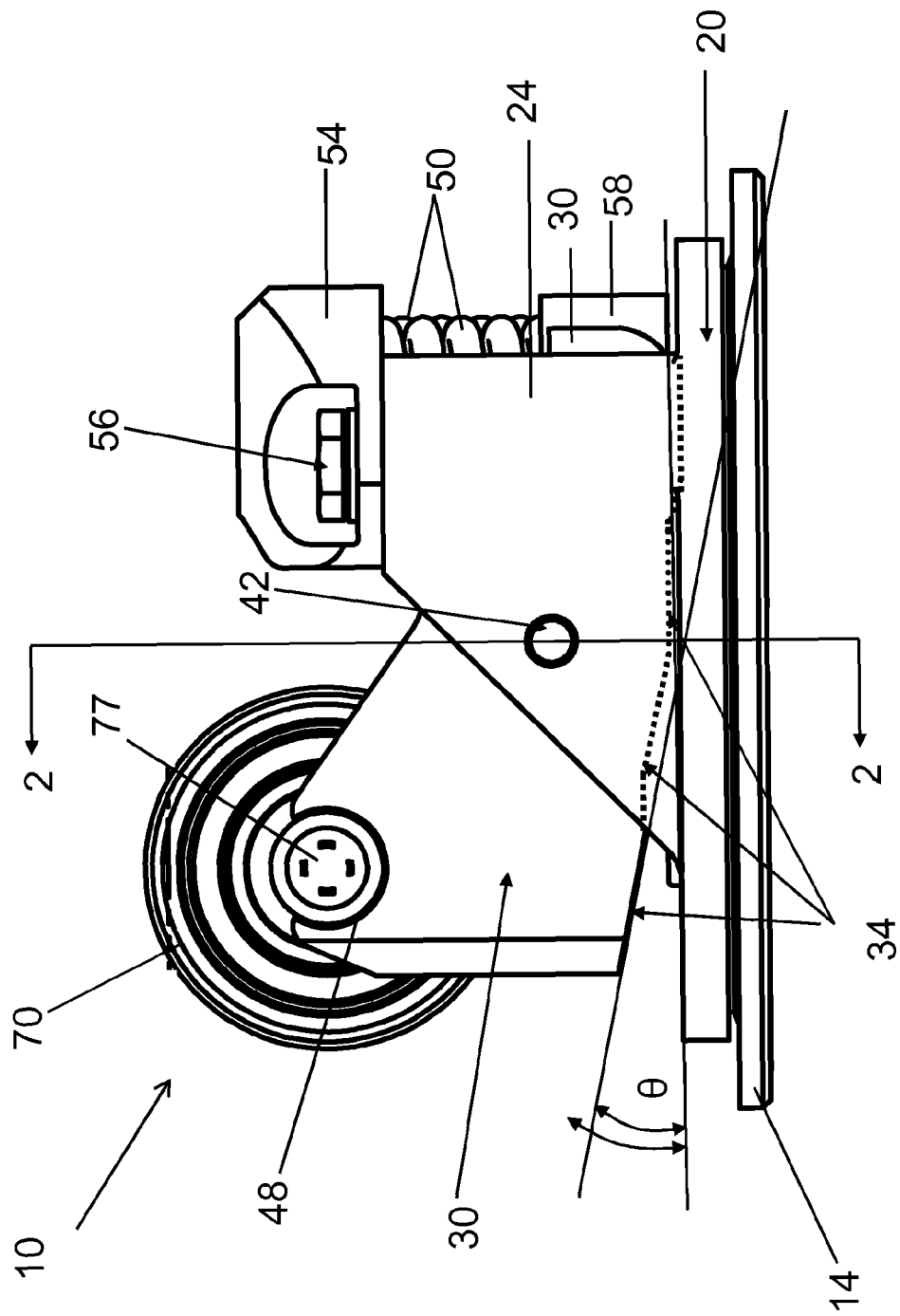
FIG. 2 is a side view of an attenuated caster.
Figure 3:
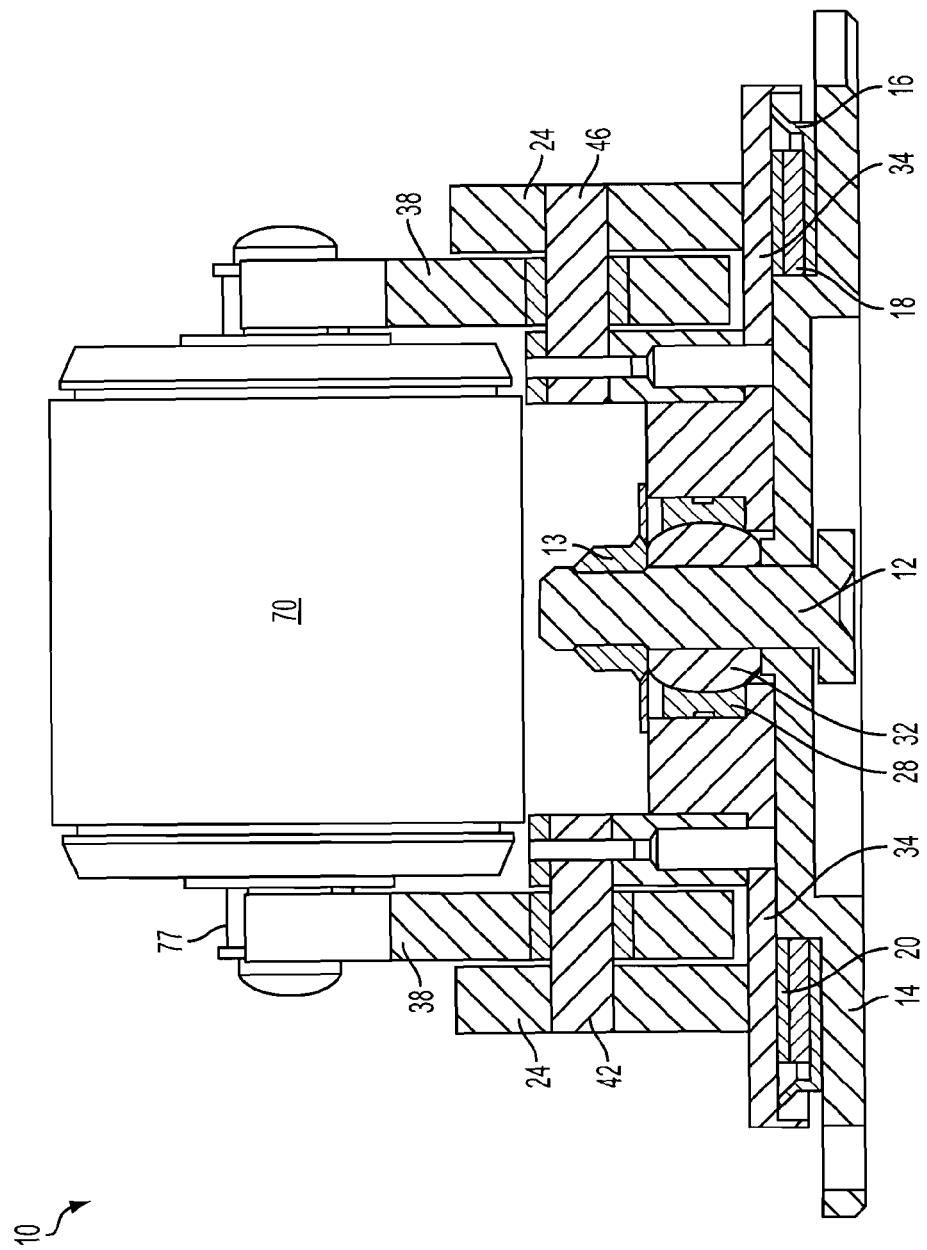
FIG. 3 is a section of FIG. 2 taken along lines 2-2.
Figure 4:
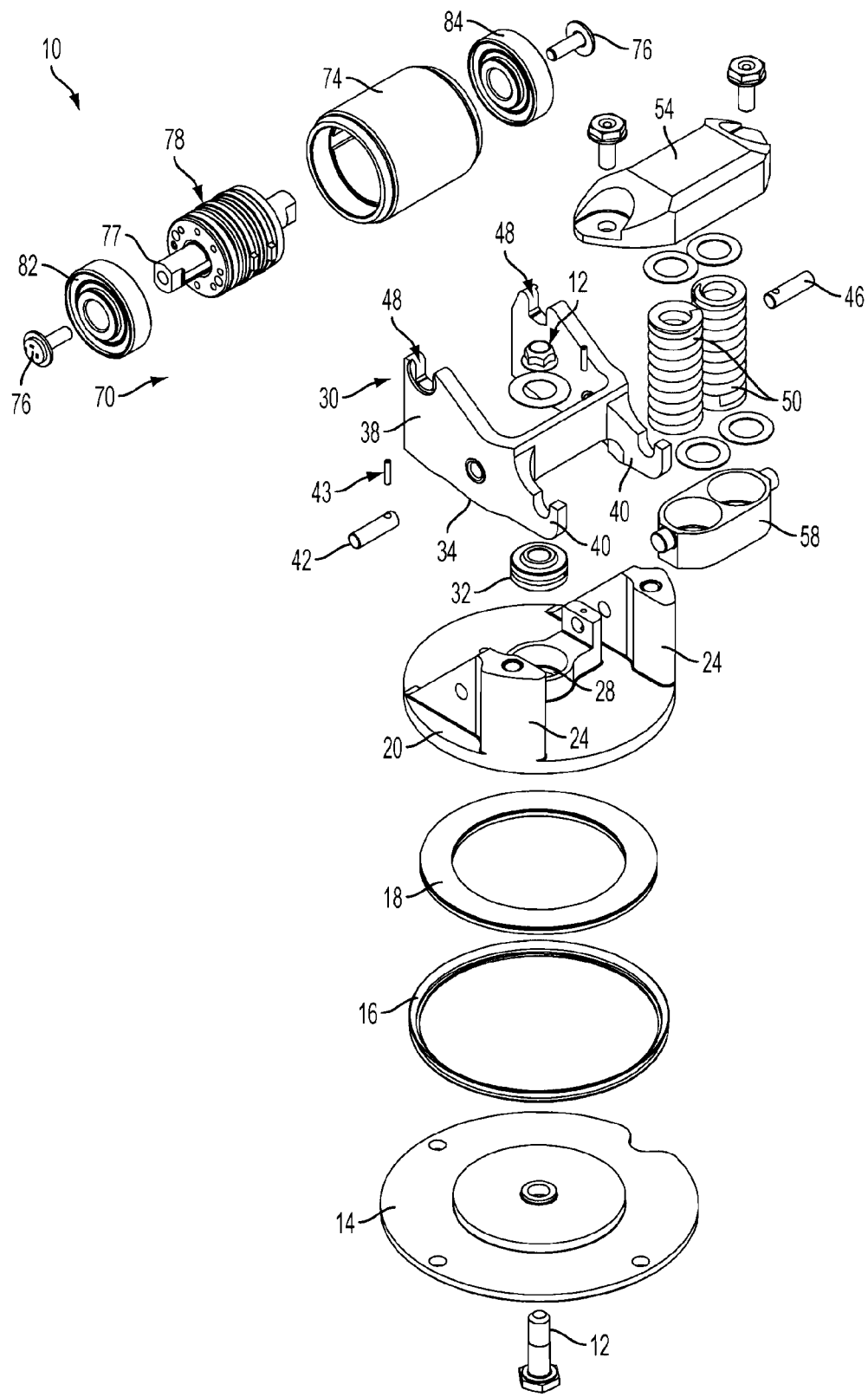
FIG. 4 is an exploded view of an attenuated caster.

FIGS. 2 through 4 show additional attributes of attenuated caster 10. Base 14 receives a seal 16, thrust bearing assembly 18 and housing 20 (see FIGS. 3 and 4). FIG. 3 shows a cross section taken along lines 2-2 of FIG. 2. As shown, bolt 12, secures the base 14, seal 16 and thrust bearing assembly 18 to housing 20. Bolt 12 can extend through spherical bearing housing 28 into spherical bearing 32 and secured by nut 13. Spherical bearing 32 can be located approximately in the center region of housing 20 between opposing housing walls 24. Thrust bearing assembly 18 and spherical bearing 32 provide 360 degrees of rotational operability to housing 20, and thus to attenuated caster 10. In one embodiment, housing 20 and housing wall 24 can be formed from aluminum, aluminum alloys, metal and metal alloys.

Figure 5:
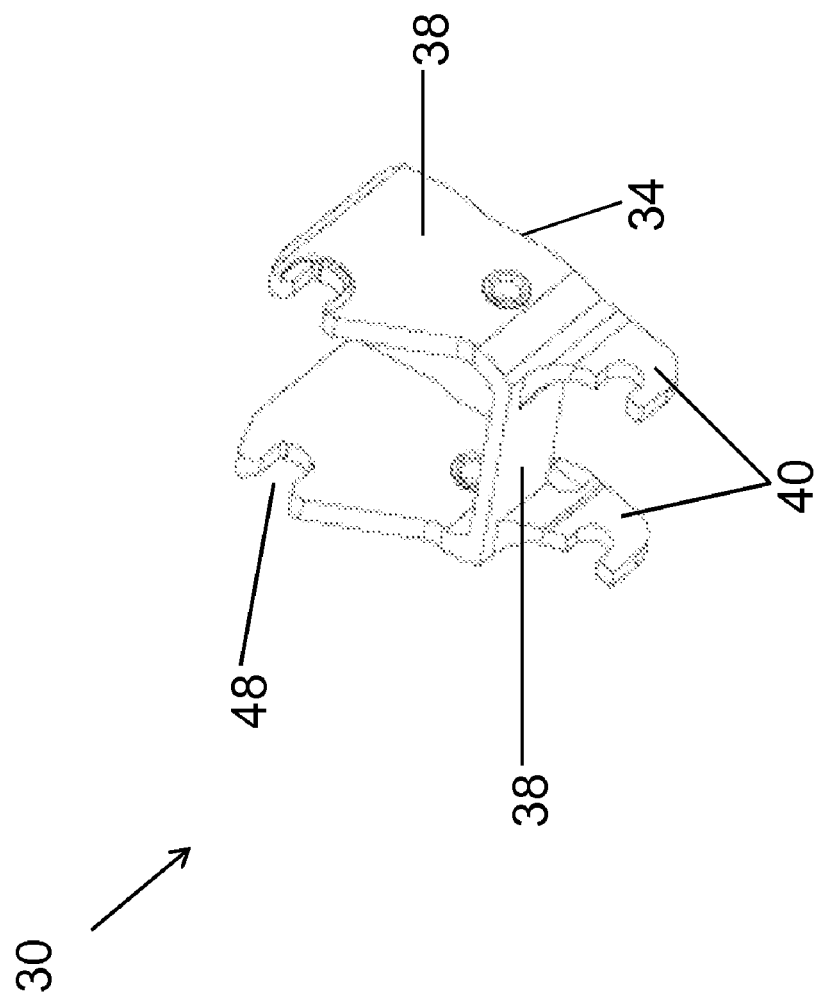
FIG. 5 is a top perspective view of a pivot assembly.
Figure 6:
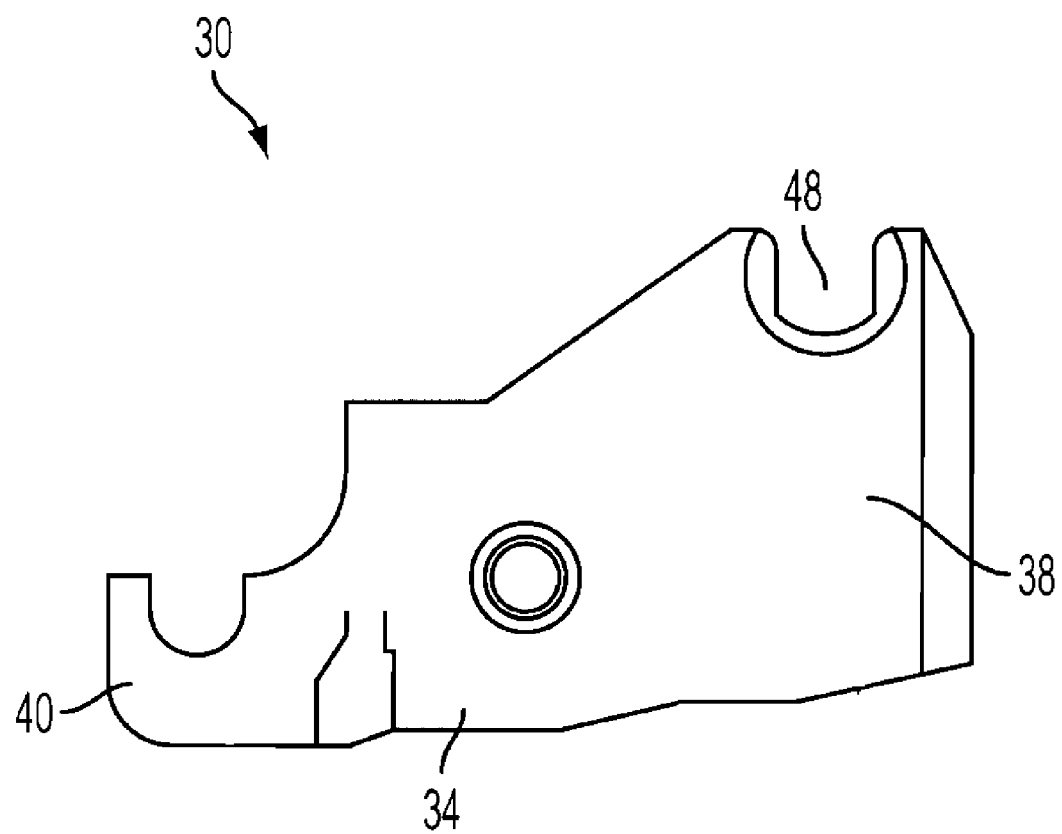
FIG. 6 is a right side view of the pivot assembly shown in FIG. 5.

FIGS. 2, 4 and 6 show an attenuated caster 10, having a pivot assembly 30 comprising a pivot wall 38 and spring engagement members 40. Pivot base 34 forms the bottom edge of both pivot wall 38 and spring engagement member 40 as shown. An embodiment of pivot wall 38 can have a center portion and two opposing sides forming a "U" shape as shown in FIGS. 4 and 5. Alternate configurations and shapes of the pivot wall 38 can be used. For example, the center portion can be a shaft and rod combination.

FIGS. 2, 3 and 4 show pivot wall 38 operably linked to housing 20 through first and second pins 42, and 46 (shown in FIGS. 3 and 4). First and second pins 42 and 46 can engage both housing wall 24 and pivot wall 38. For example, first pin 42 can slideably engage a circular opening in housing wall 24 and a corresponding circular opening in pivot wall 38. A securing pin 43 (see FIG. 4) can be inserted through an opening on the distal end of first pin 42. Similarly, a second pin 46 can engage corresponding openings in housing wall 24 and pivot wall 38. Having first and second pins 42 and 46 sized smaller than corresponding openings in housing walls 24 and pivot walls 38 provide pivot assembly 30 some independent rotational mobility apart from housing 20. Pins 42 and 46 can be formed from aluminum and/or steel alloys, and may have an optionally cadmium coatings. Alternate embodiments as known in the art such as bearing assemblies and the like can be used to provide rotational mobility of pivot assembly 30 apart from housing 20.

FIG. 5 shows spring engagement members 40 of pivot assembly 30. Spring engagement members 40 can be integrally formed with the pivot assembly 30. In alternate embodiments, spring engagement members 40 can be manufactured separately and secured to pivot wall 38 using various mechanical fasteners known in the art. In one embodiment, pivot assembly 30 can be formed from aluminum such as 7050-T7451, aluminum alloys, metals or metal alloys.

As seen in FIGS. 2, 5 and 6, pivot base 34 can form the bottom edge of pivot assembly 30. Pivot base 34 provides a mechanism, among others, through which attenuated caster 10 can be engaged to distribute the force applied to it from a ULD. Pivot base 34 can determine how far below conveyor plane 2 brake assembly 70 descends. The more brake assembly 70 descends below conveyor plane 2, the greater the distribution of load to other components forming the conveyor plane 2, as will be also discussed below. The distribution of load lessens the likelihood the aircraft may be damaged. Thus, pivot base 34 can have a "stepped" profile as shown in FIGS. 2 and 6. Pivot base 34 can have any profile that helps determine the descent of brake assembly 70. Such controlled descent can arise from pivot base 34, a portion, or a tangent of pivot base 34 forming angle θ with respect base 14. For example, alternate embodiments of pivot base 34 can have a curvilinear profile (not shown), a straight profile (not shown) or any combination thereof. Curvilinear refers to a profile having more than one radius of curvature.

A pivot base 34 can form an angle θ with housing 20, as shown in FIG. 2. Angle θ can be any acute angle measured from a line substantially orthogonal to housing 20. As shown, a portion of pivot base 34 proximate to spring engagement member 40 may contact housing 20 (as shown by dashed lines) prior to attenuated caster 10 receiving a ULD. Accordingly, angle θ can be at its minimum when attenuated caster 10 is fully deployed.

FIG. 4 shows spring engagements member 40 protruding from pivot wall 38 and receiving spring support 58. A spring cover 54 can be positioned over spring(s) 50 and secured to the top of housing wall 24 using various mechanical fasteners, as is known in the art. As shown, a hex bolt 56 can be used as a securing fastener. The spring cover 54 thus applies some force to springs 50, countered by spring support 58. While springs are shown in FIGS. 1, 2 and 4, alternate embodiments include the use of flex springs, a combination of flex springs, or any other biasing materials, apparatus or devices can be used.

Referring to FIGS. 1 and 4, a brake assembly 70 can comprise roller surface 74, a friction disk brake assembly 78, and a brake assembly shaft 77 as is known in the art. First and second roller bearings 82 and 84 can be adjacent to opposing sides of friction disk brake assembly 78. Roller surface 74 can be a cylinder with opposing open ends surrounding friction disk brake assembly 78 and roller bearings 82 and 84 (roller bearing 84 not shown in FIG. 1). Roller surface 74 can be all or partially rubber, a rubber compound, a polymeric material such as nylon, or other materials known in the art.

Brake assembly 70 can be fastened to pivot assembly 30. Brake assembly shaft 77 mattingly fits in openings 48 of pivot assembly 30 as shown in FIGS. 1 and 2. Opening 48 can be square to receive the ends of brake assembly shaft 77 thereby limiting the rotational movement of brake assembly shaft 77. As a ULD bears upon roller surface 74, frictional disc brake assembly 78 and openings 48 can restrict or retard rotation of the brake assembly 70.

Figure 7:
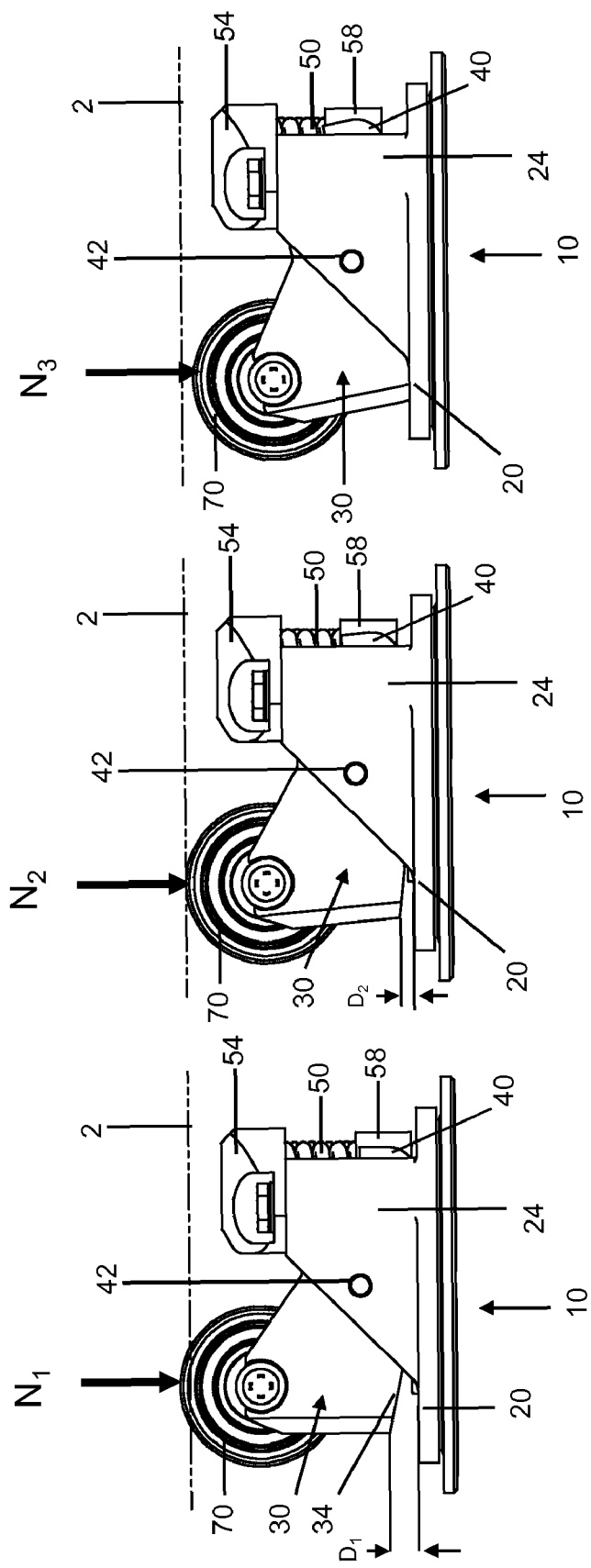
FIGS. 7A, 7B and 7C show an attenuated caster and the conveyor plane.

While an embodiment described herein refers to attenuated caster 10 having a brake assembly 70 forming the uppermost rolling element, this invention also encompasses the embodiment whereby the assembly 70 does not have the frictional disc brake assembly 78 or any other braking mechanism. For example, the rotating element of assembly 70 can be free rolling element, and not intended to help brake or restrict movement of a ULD FIGS. 7A, 7B and 7C show an embodiment where the force of a ULD applied to brake assembly 70 can be attenuated by a controlled descent below the conveyor plane 2. Pivot assembly 30 can rotatably cooperate with housing walls 24 and spring(s) 50 to implement the force attenuation and controlled decent of brake assembly 70. In one embodiment, attenuated caster 10 operates to limit movement of a ULD while distributing the load to other components of the conveyor plane 2 of a cargo deck to minimize damage.

More specifically, as shown in FIG. 7A a portion of brake assembly 70 initially can be positioned above conveyor plane 2, thus positioned to ensure contact with a moving ULD. The portion of pivot assembly 30 below brake assembly 70 can be partially elevated above housing 20 by distance $D_1$. Pivot base 34 (shown partially hidden by housing wall 24 in FIG. 2) slopes downwardly in a stepped manner toward a pivot proximate to spring engagement member 40. In alternate embodiments, pivot base profile may have multiple pivots located at any portion along pivot base 34. Spring cover 54 fastened to housing wall 24 compresses spring 50 against spring support 58 forcing spring engagement member(s) 40 downwardly toward housing 20.

As a ULD approaches (not shown) attenuated caster 10, the ULD first contacts brake assembly 70. Due to the friction disc brake operation of brake assembly 70, movement of the ULD is slowed or stopped. The initial normal force $N_1$ is that force pressing downward due to the portion of the ULD weight initially experienced by attenuated caster 10. Because the brake assembly 70 extends above the conveyor plane 2, this load can be quite high since the ULD can be elevated so that the other rolling elements that help define the conveyor plane 2 are carrying little or even none of the ULD load.

In FIG. 7B, brake assembly 70 has rotated downward in response to $N_1$, due to the rotation of pivot assembly 30. When this occurs, the normal force changes to $N_2$, because the ULD weight distribution is altered. More of the ULD weight is carried by neighboring rolling elements (not shown). In the condition of FIG. 7B, a portion of pivot assembly 30 below brake assembly 70 can be partially elevated above housing 20 by distance $D_2$.

FIG. 7C shows a brake assembly 70 positioned below conveyor plane 2 in its fully compressed or fully loaded condition. As shown, the distance between the pivot assembly 30 and housing 20 is reduced to zero. This condition can result where the normal force $N_3$ causes a further lowering of the brake assembly to the "bottom out" position of the pivoting assembly. Among other conditions, this can occur where the underside of a ULD is uneven or where the spacing of the rolling elements causes a further depression of the pivot assembly 30. The extent of depression or descent will be a factor of the ULD loads, positioning of the rolling elements and spring characteristics selected or employed, as will be known by those in the art.

More specifically, as the ULD traverses over attenuated caster 10, force $N_3$ causes on spring engagement member 40 to rotate pivot assembly 30 elevating brake assembly 70 above the conveyor plane 2. While the spring constant of springs 50 can control the movement of spring engagement member 40 towards housing 20, spring constant can also impact the descent of brake assembly 70 below conveyor plane 2.

In an embodiment of attenuated caster 10, helical compression springs operate to balance the decent and elevation of brake assembly 70. For example, FIGS. 7A through 7C show the use of two helical compression springs each having a spring rate between about 320 lbs/in (5.7 kg/mm) to about 350 lbs/in (6.2 kg/mm), with one embodiment having a spring rate of about 340 lbs/in (6.07 kg/mm). Spring rate refers to the amount of force applied to a spring per unit deflection, as is known in the art. Thus, the spring constant can also refer to the strength, or stiffness of a spring. Springs 50 can have between about 8 to about 12 coils, with one embodiment having about 10 coils. Further, springs 50 can have coil diameters between about 0.35 inches (0.13 cm) to about 0.45 inches (0.17 cm), with one embodiment having about a 0.4 inch coil diameter. Springs 50 can also have a wire diameter between about 0.075 inches (0.029 cm) to about 0.2 inches (0.078 cm). In one embodiment having a wire diameter about 0.125 inches (0.049 cm). These parameters correspond to about 175 lb (79 kg) preload at brake assembly 70 and to about 250 lb (113 kg) load at the brake assembly at full descent. Thus, the spring parameters have been found to provide an attenuated caster 10 with effective braking given the spatial restrictions of the aircraft. Further, such spring parameters provide the desired brake assembly 70 descent behavior when used in conjunction with pivot base 34.

Figure 8:
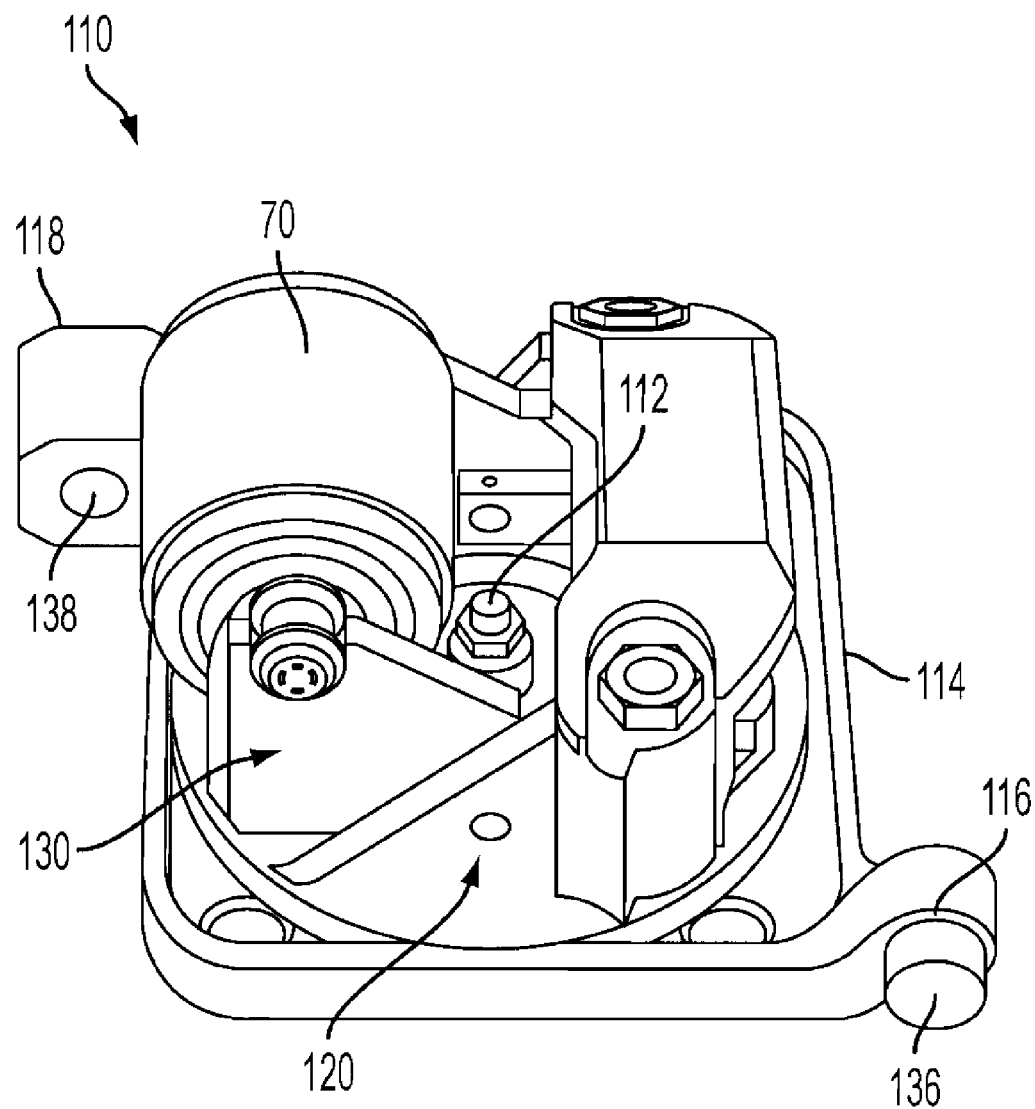
FIG. 8 shows atop perspective view of an embodiment of an attenuated caster.

FIG. 8 shows an embodiment of attenuated caster 110 capable of deployment within a roller tray 8 on a cargo deck (roller tray and cargo deck not shown). Pivot assembly 130 can be operably linked to housing 120 as describe above. Housing 120 can be secured to a base frame 114 using a bolt 112 and nut 113 (bolt, thrust bearing assembly and spherical bearings not shown). In alternate embodiments, mechanical fasteners can be used to mount housing 120 to base frame 114, as is known in the art.

Base frame 114 can comprise first and second arms 116 and 118 capable of removably securing attenuated caster 110 to a roller tray 8 (not shown). First and second arms 116 and 118 engage opposing sides of a roller tray 8, and thus can be located on opposite sides, or corners, of base frame 114. As shown in FIG. 8, first arm 116 projects upwardly an edge of base 114. A rod 136 projects orthogonally from first arm 116 and can be designed for insertion into a corresponding opening along the side of a roller tray.

A second arm 118 also projects upwardly from corner opposite first arm 16. Second arm 118 contains an opening 138 that can correspond to an opening along the side of a roller tray. A pin (not shown) can be inserted through an opening in the roller tray and into the opening 138 of second arm 118. Thus, first and second arms 116 and 118 can removably secure attenuated caster 110 along roller tray.

Figure 9A:
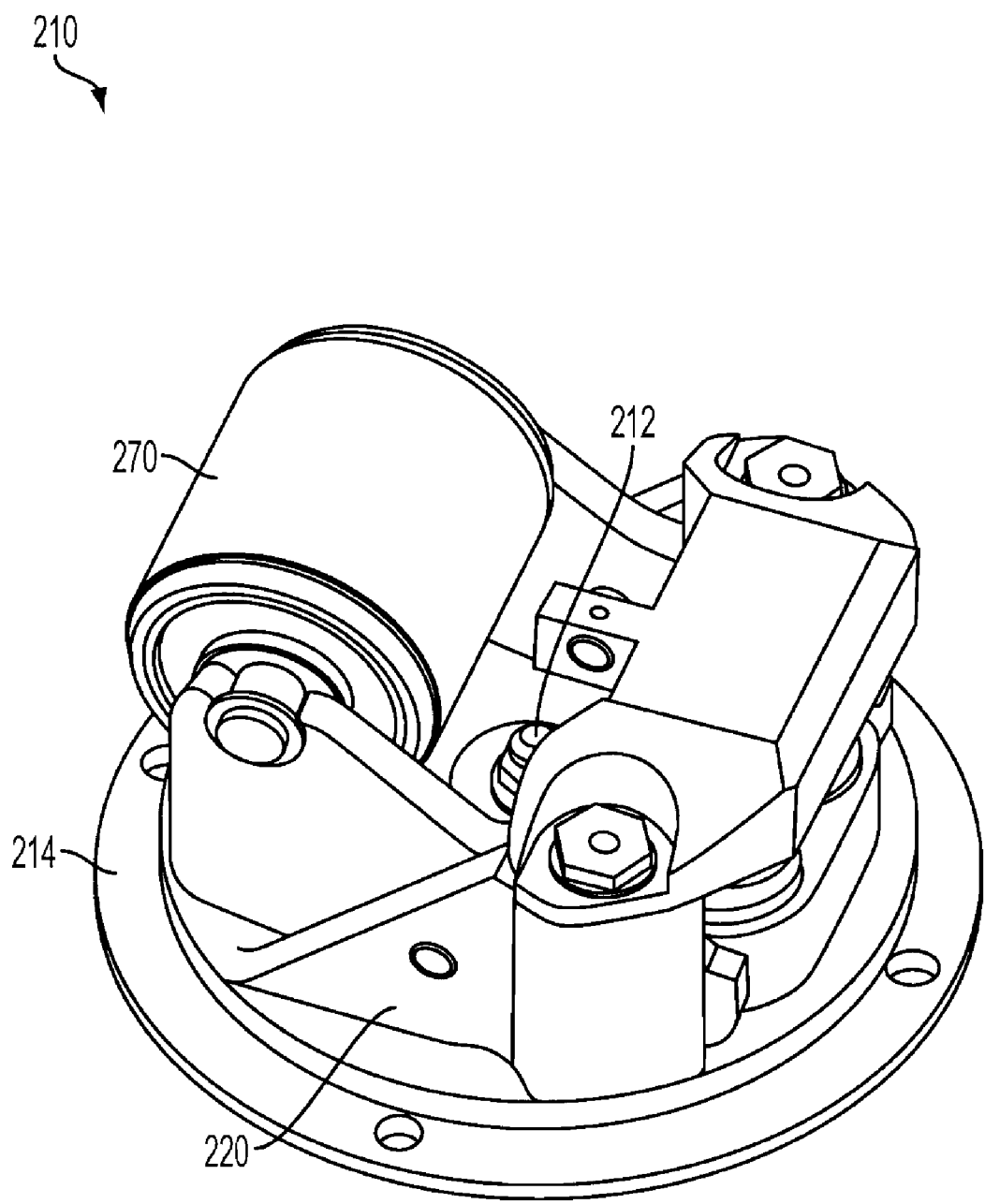
FIGS. 9A and 9B show top perspective views of another embodiment of an attenuated caster.
Figure 9B:
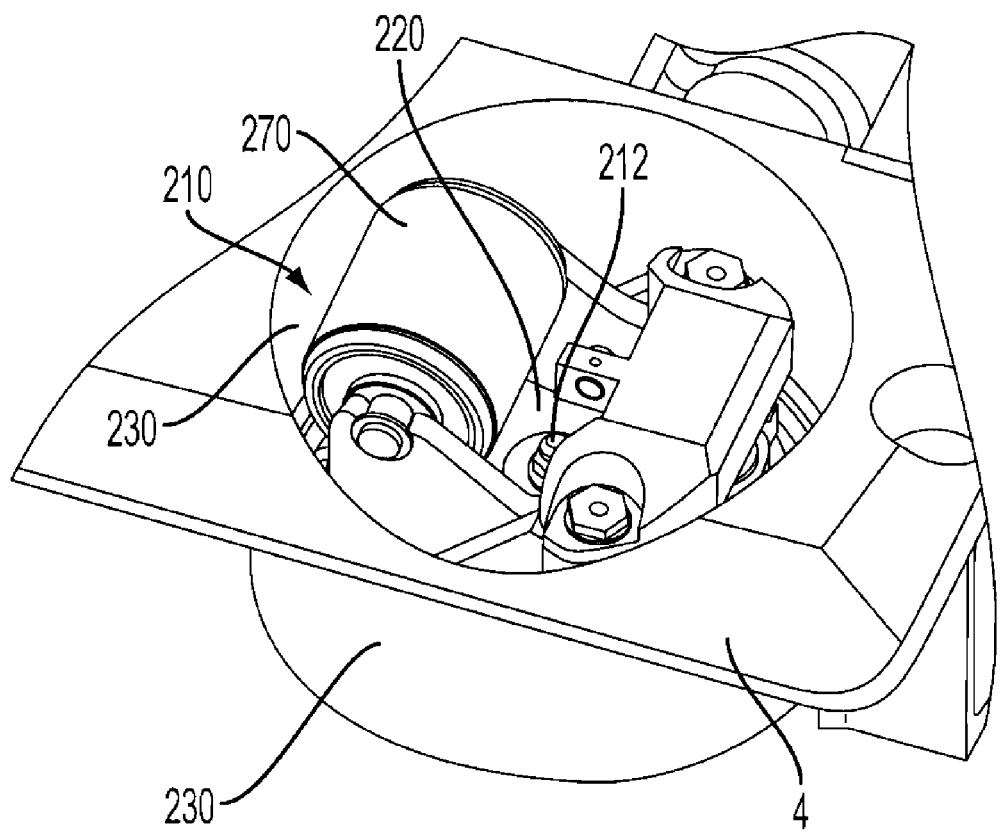

FIGS. 9A and 9B show attenuated caster 210 capable of deployment within a cargo deck 4. Attenuated caster 210 can be mounted to cargo deck 204 inside cargo deck housing 230. A bolt 212 and nut can be used to secure housing 220 to base 214. In alternate embodiments, other mechanical fasteners such as screws, braces and the like can be used. As the need may arise base 214 can be permanently mounted inside cargo deck housing 230 using methods such as welding and the like.

Figure 10:
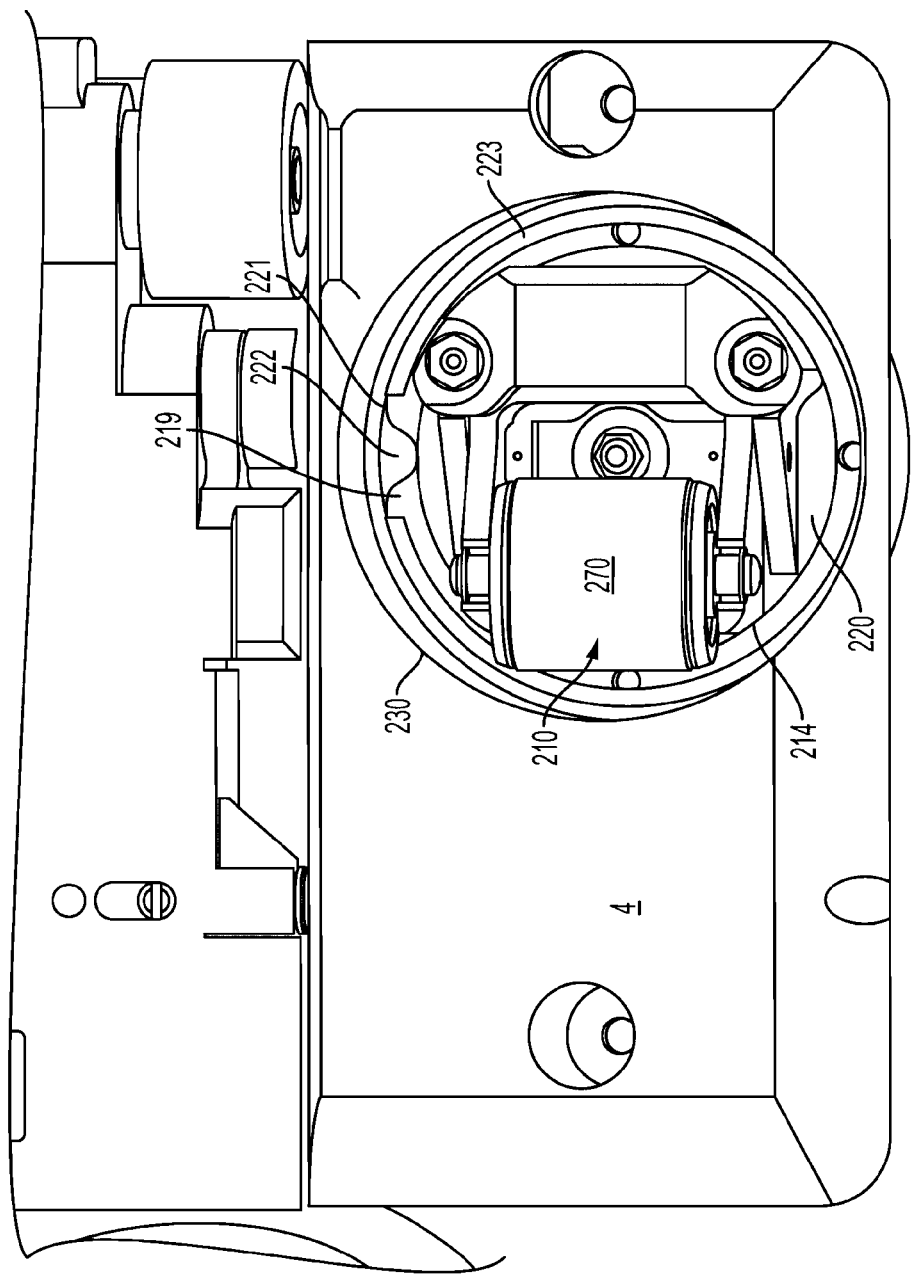
FIG. 10 is top perspective view of another embodiment of an attenuated caster.
Figure 11:
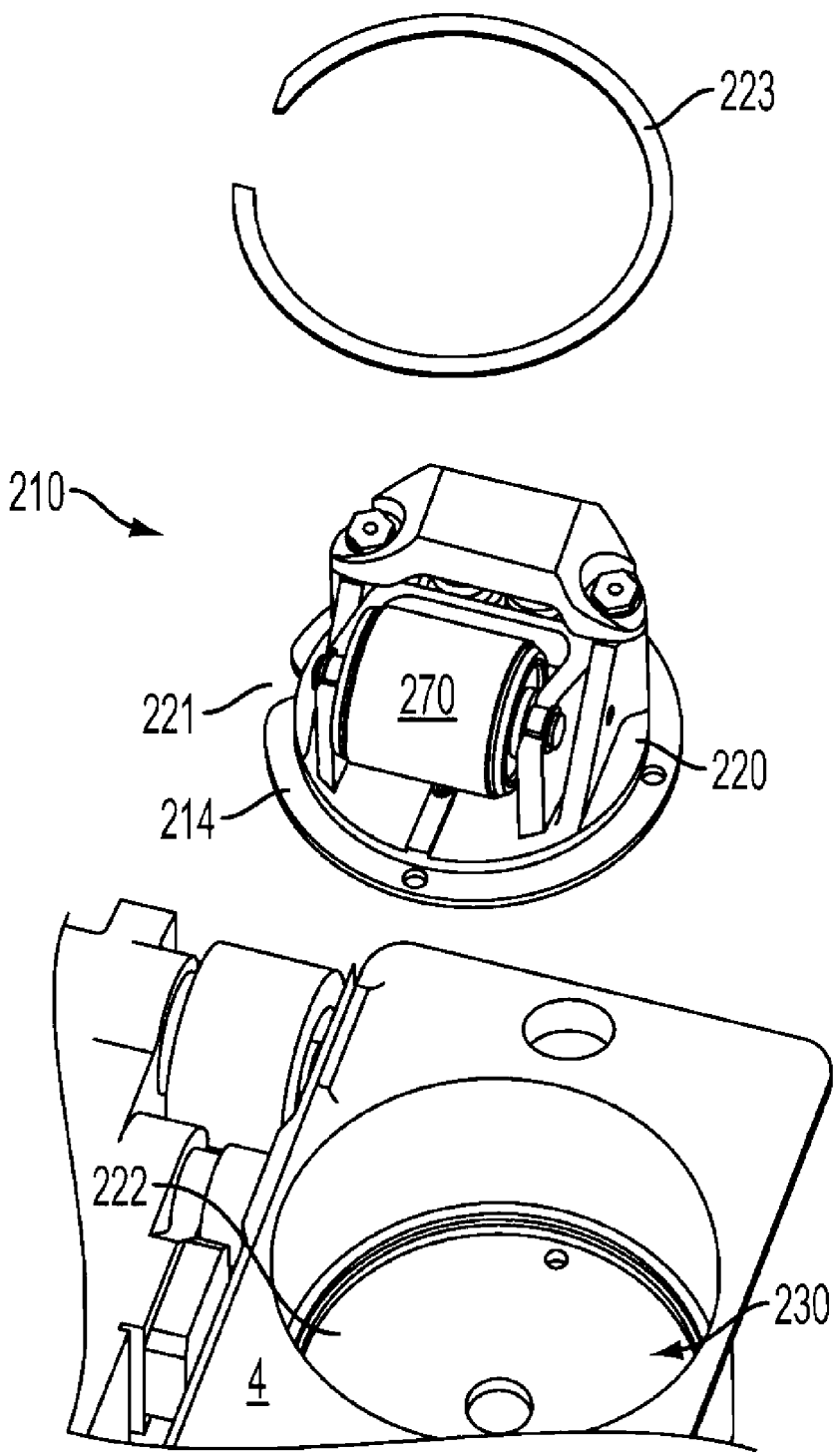
FIG. 11 shows a top perspective assembly view an attenuated caster and a cargo deck.

FIGS. 10 and 11 shows another embodiment of attenuated caster 210 deployed with a retaining ring 223. An attenuated caster 210 deployed in cargo deck 4 can form a gap 219 between base 214 and the side of cargo deck housing 230. A retaining ring 223 can fill a gap 219 improving stability of attenuated caster 210 inside cargo deck housing 230. Retaining ring 223 can be a partial annulus (as shown in FIG. 11) that partially surrounds base 214. Also shown in FIGS. 10 and 11 is a projection 222 at the bottom of cargo deck housing 230 and notch 221 on base 214. Retaining ring 223 leaves some space for a notch 221 and projection 222 and to mate when cargo deck housing 230 receives attenuated caster 210. Notch 221 and projection 222 can cooperate to limit rotational movement of the base 214 as the need may arise.

Figure 12:
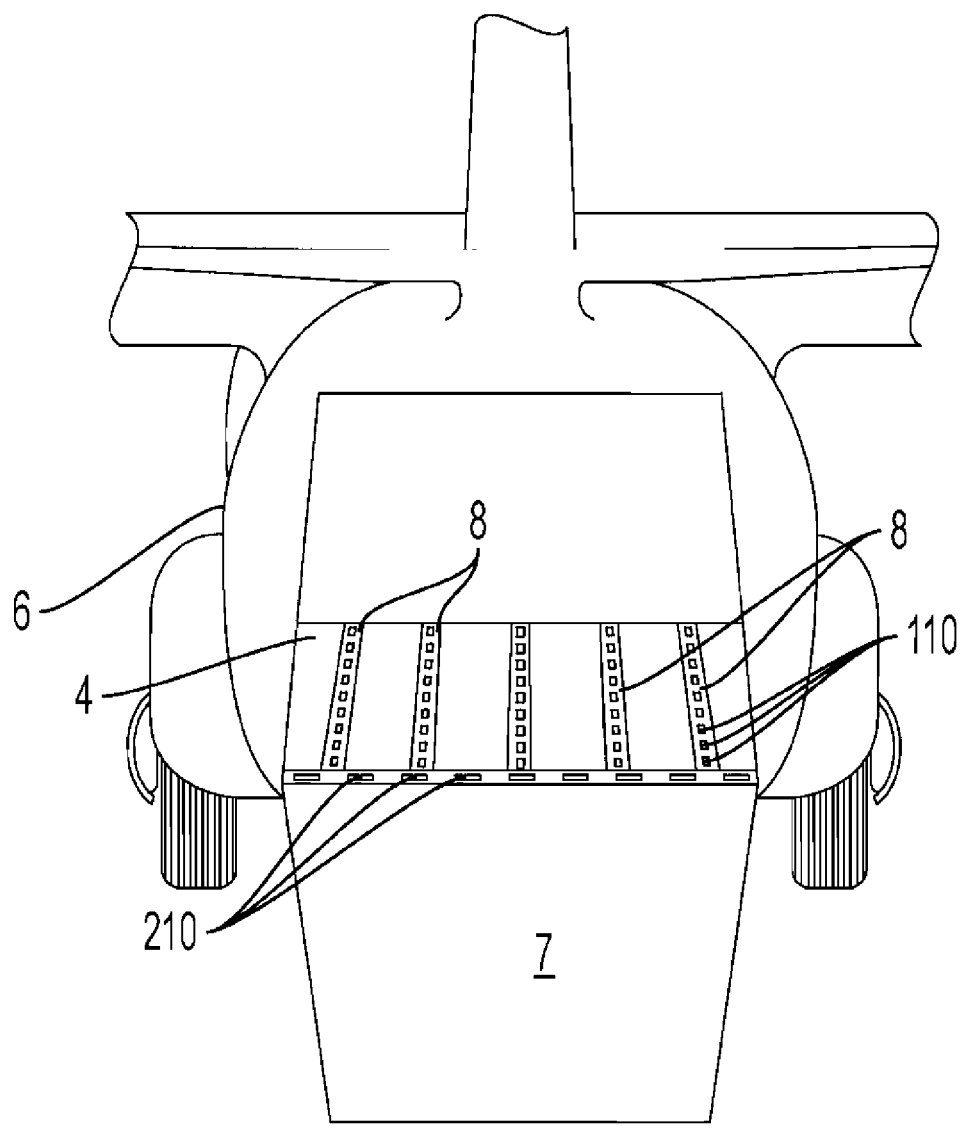
FIG. 12 is a rear perspective view of an open cargo door of a fuselage showing an embodiment of attenuated casters on a cargo deck.
Figure 13:
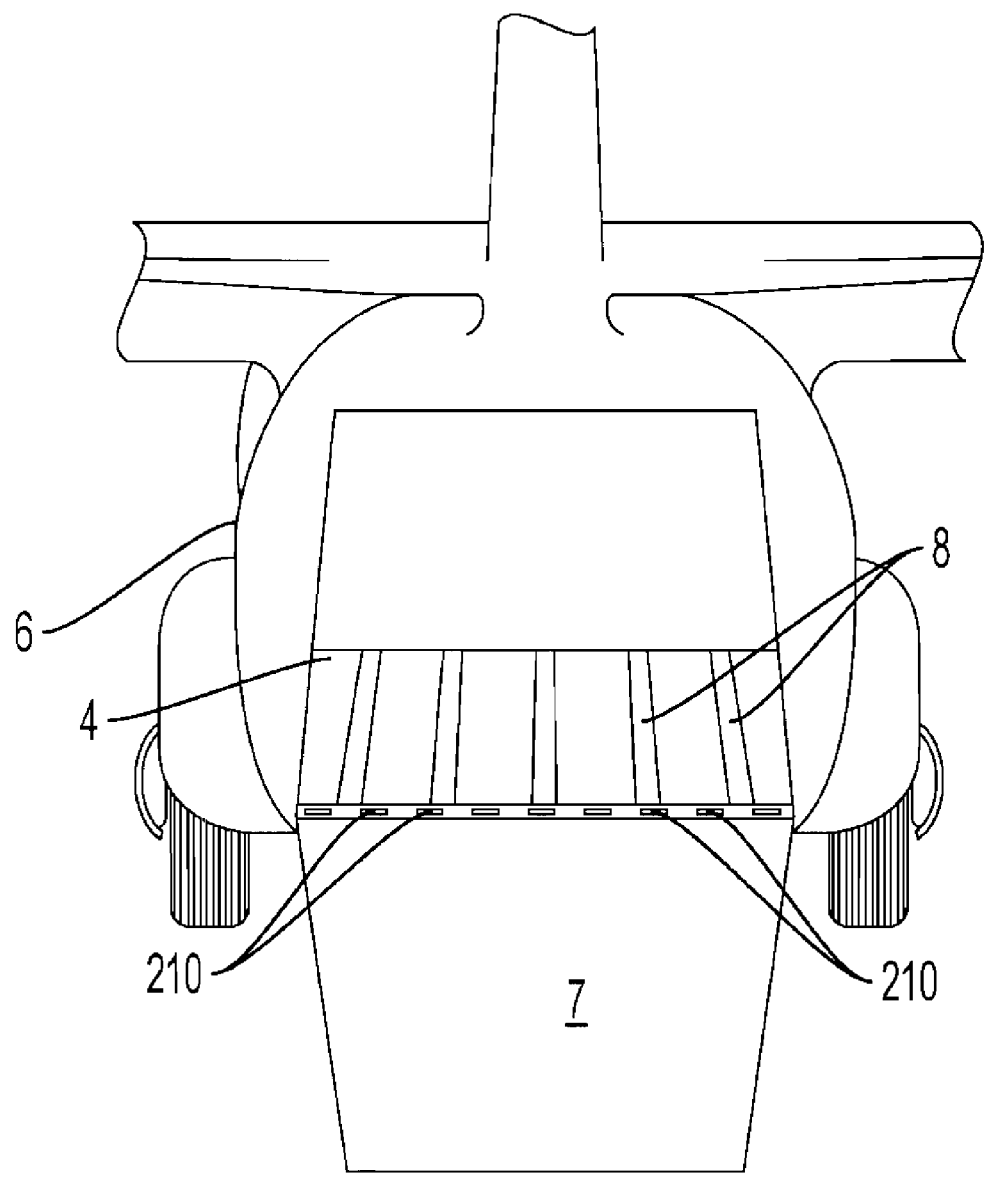
FIG. 13 is a rear perspective view of an open cargo door of a fuselage showing an embodiment of attenuated casters on a cargo deck

FIGS. 12 through 15 show various embodiments of attenuated casters (110, 210) distributed throughout a cargo deck 4. FIGS. 12 and 13 shows a rear perspective views of the fuselage of an aircraft with cargo door 7 open. As shown in FIG. 12, six attenuated casters (210) can be arranged on cargo deck 4 proximate to cargo door 7 and a plurality of attenuated casters 110 shown removably secured in roller tray(s) 8. Attenuated casters 210 can be deployed however, in any arrangement as the need may arise. FIG. 13 shows another embodiment where attenuated casters 210 are deployed along the cargo deck 4 proximate to the cargo door 7.

Figure 14:
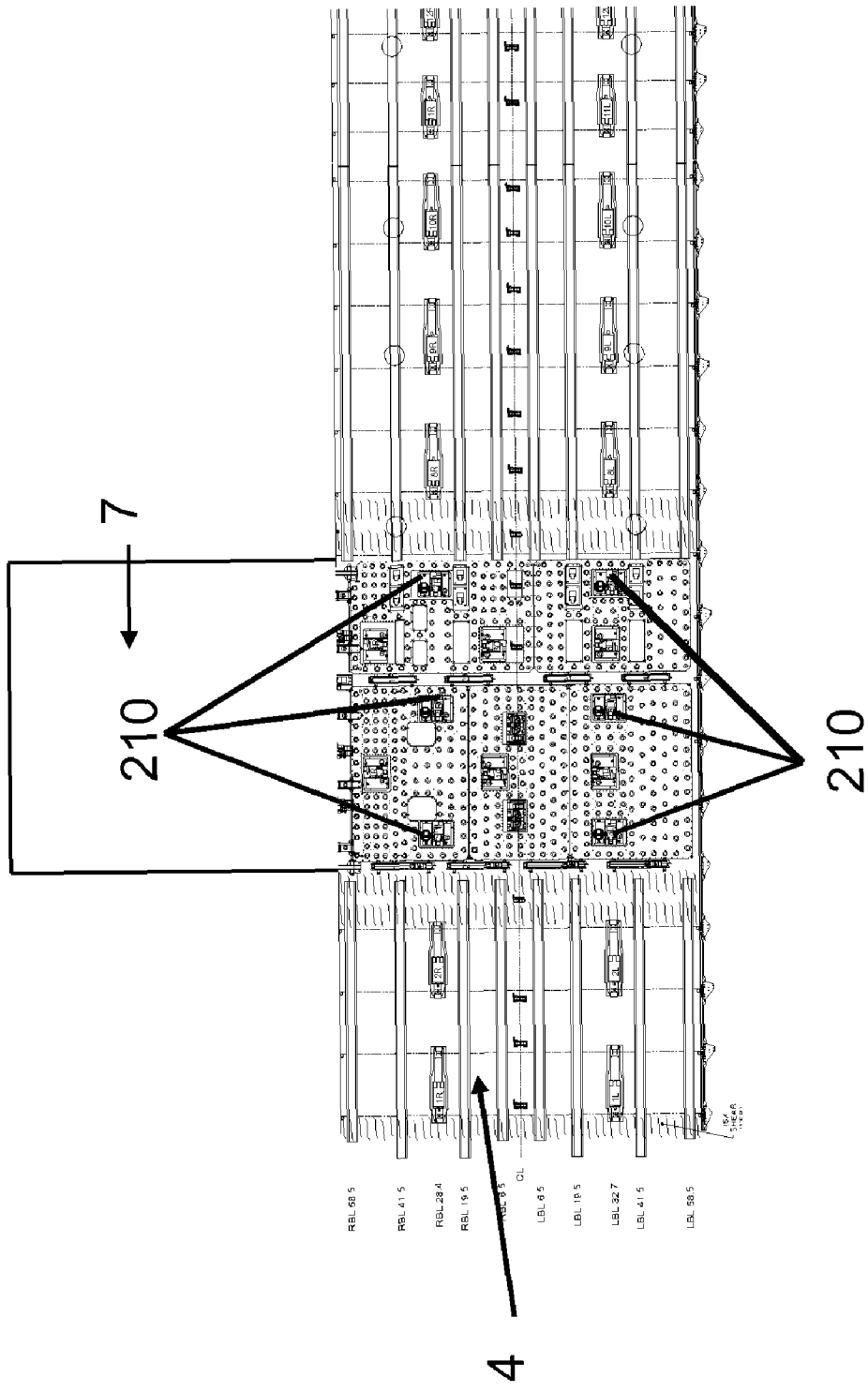
FIG. 14 is a top view of the cargo deck of an aircraft showing attenuated casters on the cargo deck near a forward cargo door.
Figure 15:
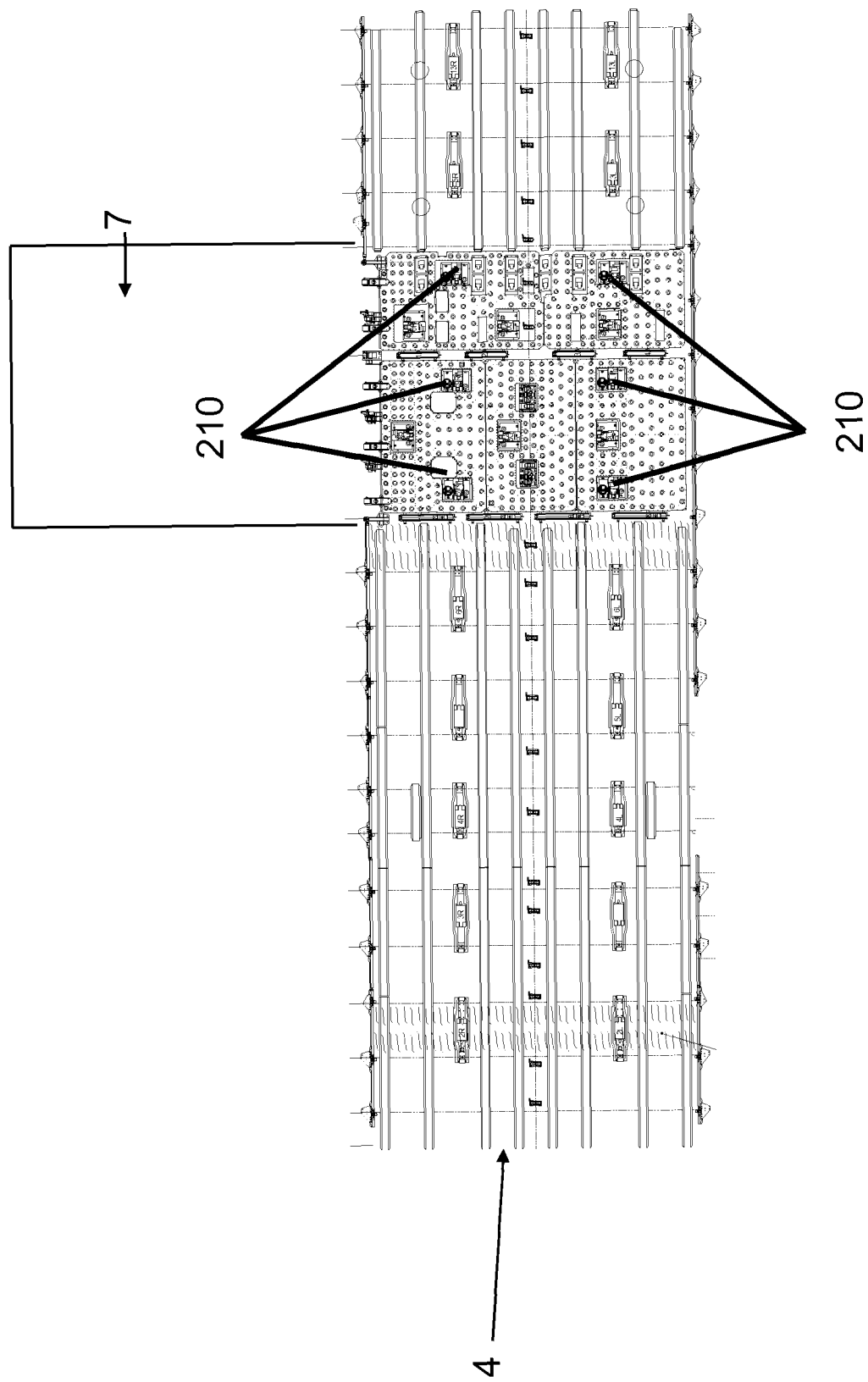
FIG. 15 is a top view of the cargo deck of an aircraft showing attenuated casters on the cargo deck near an aft cargo door.

FIGS. 14 and 15 show a top view of a portion of a cargo deck having forward cargo door 7 (FIG. 14) and an aft cargo door 7 (FIG. 15). Attenuated casters 210 are shown deployed in a staggered arrangement along cargo deck 4. Arranged in such a manner, attenuated casters 210 can slow or stop the movement of the ULD as it approaches the cargo door 7.

The above description of various embodiments of the invention is intended to describe and illustrate various aspects of the invention, and not to limit the invention thereto. Persons of ordinary skill in the art will recognize that certain changes and modifications can be made to the described embodiments without departing from the invention. All such changes and modifications are intended to be within the scope of the appended claims.

What is claimed is:

1. An attenuated caster for use on a cargo deck in an aircraft, the caster comprising:
   a base;
   a housing rotatably connected to the base permitting rotational movement about the base; and
   a pivot assembly connected to the housing, the pivot assembly comprising:
      a first end;
      a second end;
      a pivot between the first and second ends;
      a roller and shaft connected to the first end; and
      a bias connected to the second end; wherein:
   the bias downwardly biases the second end so that the roller and shaft are upwardly biased and capable of biased movement in response to a load impressed upon the roller.

2. The attenuated caster of claim 1, wherein the roller further comprises a brake to assist in restricting the movement of a load at least partially supported by the roller.

3. The attenuated caster of claim 2, wherein the brake is a friction disc brake.

4. The attenuated caster of claim 1, wherein the roller is an elongated roller.

5. The attenuated caster of claim 1, wherein the bias comprises at least one spring for upwardly biasing the roller.

6. The attenuated caster of claim 5, wherein the housing further comprises a spring cover restraining one end of the spring to facilitate biasing.

7. The attenuated caster of claim 5, wherein the spring comprises at least one helical compression spring.

8. An attenuated caster for use on a cargo deck in an aircraft, the caster comprising:
   a base;
   a housing rotatably connected to the base permitting 360 degree rotational movement about the base; and
   a pivot assembly connected to the housing, the pivot assembly comprising:
      a pivot; and
      an upwardly biased roller, the roller capable of occupying a first position when the roller is unloaded, and a second position when the roller is subjected to a load; wherein:
   a bias biases a first portion of the pivot assembly downwardly to thereby bias the roller upwardly via the pivot; and
   the biased roller assists in attenuating the load transferred to the cargo deck.

9. The attenuated caster of claim 8, wherein the roller further comprises a brake to assist in restricting the movement of a load at least partially supported by the roller.

10. The attenuated caster of claim 9, wherein the brake is a friction disc brake.

11. The attenuated caster of claim 8, wherein the roller is an elongated roller.

12. The attenuated caster of claim 8, wherein the bias comprises at least one spring for upwardly biasing the roller.

13. The attenuated caster of claim 12, wherein the housing further comprises a spring cover restraining one end of the spring to facilitate biasing.

14. The attenuated caster of claim 12, wherein the spring comprises at least one helical compression spring.

15. An attenuated caster for use on a cargo deck in an aircraft, the caster comprising:
   a base;
   a housing rotatably connected to the base permitting 360 degree rotational movement about the base; and
   a pivot assembly connected to the housing, the pivot assembly comprising:
      a pivot; and
      an upwardly biased roller, a shaft within the roller supported by the pivot assembly,
      a means for biasing a first portion of the pivot assembly downwardly towards the base and the roller upwardly from the base in response to a load applied on the roller.

16. The attenuated caster of claim 15, wherein the roller further comprises a brake to assist in restricting the movement of a load at least partially supported by the roller.

17. The attenuated caster of claim 16, wherein the brake is a friction disc brake.

18. The attenuated caster of claim 15, wherein the roller is an elongated roller.

19. The attenuated caster of claim 15, wherein the means for biasing comprises at least one spring for upwardly biasing the roller.

20. The attenuated caster of claim 19, wherein the housing further comprises a spring cover restraining one end of the spring to facilitate biasing.

21. The attenuated caster of claim 19, wherein the spring comprises at least one helical compression spring.

22. An attenuated caster for use on a cargo deck in an aircraft, the caster comprising:
   a base;
   a housing rotatably connected to the base permitting rotational movement about the base; and
   a pivot assembly connected to the housing, the pivot assembly comprising:
      a first end;
      a second end;
      a pivot between the first and second ends;
      a roller and shaft connected to the first end; and
      a bias connected to the second end and configured to downwardly bias the second end and thereby upwardly bias the first end via the pivot, so that the roller and shaft at the first end are upwardly biased in response to a load impressed on the roller.

* * * * *